US009100473B2

(12) United States Patent
Vaananen

(10) Patent No.: US 9,100,473 B2
(45) Date of Patent: *Aug. 4, 2015

(54) CALLER ID SURFING

(71) Applicant: SUINNO OY, Helsinki (FI)

(72) Inventor: Mikko Vaananen, Helsinki (FI)

(73) Assignee: SUINNO OY, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 14/586,183

(22) Filed: Dec. 30, 2014

(65) Prior Publication Data

US 2015/0119010 A1 Apr. 30, 2015

Related U.S. Application Data

(63) Continuation of application No. 12/774,312, filed on May 5, 2010, now Pat. No. 8,983,039.

(51) Int. Cl.
H04M 11/00 (2006.01)
H04M 3/42 (2006.01)
G06F 17/30 (2006.01)
(Continued)

(52) U.S. Cl.
CPC ..... *H04M 3/42068* (2013.01); *G06F 17/30864* (2013.01); *G06Q 10/10* (2013.01); *H04L 67/104* (2013.01); *H04M 1/56* (2013.01); *H04M 1/575* (2013.01); *H04W 4/16* (2013.01);
(Continued)

(58) Field of Classification Search
CPC .. G06F 17/30864; H04M 1/56; H04M 3/5322
USPC .......... 379/88.11, 88.12, 93.01, 93.17, 93.18, 379/93.23, 122, 136, 167.12, 201.04; 345/420
See application file for complete search history.

(56) References Cited

U.S. PATENT DOCUMENTS 5,724,412 A 3/1998 Srinivasan
6,782,086 B2 8/2004 Clapper
(Continued)

FOREIGN PATENT DOCUMENTS

EP 1 587 291 10/2005
WO 9950916 10/1999
(Continued)

OTHER PUBLICATIONS

Evoca, Record interviews, empower your voice, 2009 Evoca LLC, XP055032896, Cited in European Office Action.
(Continued)

*Primary Examiner* — Md S Elahee
(74) *Attorney, Agent, or Firm* — Young & Thompson

(57) ABSTRACT

A method and system for displaying and producing computer based documents seamlessly to users that relate to their telephone calls is provided. The invention is able to be used with social media, where the mobile station searches for the social media page of the caller based on the Caller ID and displays it to the recipient of the call on the mobile station screen, possibly with other Internet search results. The method and system allow the user to obtain the newest public information about the person who calls him or he decides to call, or any documents that might be intermittent between the people. The system adds "bandwidth", i.e. speed, efficiency and more dimensions to personal communication, as the users of the inventive system can also visually see by documentation what is going on in the relationship between two or more people.

8 Claims, 9 Drawing Sheets

(51) Int. Cl.
  *G06Q 10/10*   (2012.01)
  *H04M 1/56*    (2006.01)
  *H04L 29/08*   (2006.01)
  *H04W 4/16*    (2009.01)
  *H04M 1/2745*      (2006.01)
  *H04M 1/57*        (2006.01)
  *H04M 1/725*       (2006.01)

(52) U.S. Cl.
  CPC ........... *H04M1/274516* (2013.01); *H04M 1/57* (2013.01); *H04M 1/72561* (2013.01)

(56) References Cited

U.S. PATENT DOCUMENTS

| | | |
|---|---|---|
| 7,822,739 B2 | 10/2010 | Srikanth et al. |
| 7,987,110 B2 | 7/2011 | Cases et al. |
| 8,225,413 B1 | 7/2012 | De et al. |
| 8,290,139 B2 | 10/2012 | Kumar et al. |
| 8,295,465 B2 | 10/2012 | Altberg et al. |
| 8,306,922 B1 | 11/2012 | Kunal et al. |
| 2003/0005626 A1 | 1/2003 | Yoneda et al. |
| 2005/0010573 A1 | 1/2005 | Garg |
| 2005/0069095 A1 | 3/2005 | Fellenstein et al. |
| 2005/0120084 A1 | 6/2005 | Hu et al. |
| 2005/0216300 A1 | 9/2005 | Appelman et al. |
| 2006/0031772 A1 | 2/2006 | Valeski |
| 2007/0250566 A1 | 10/2007 | Appelman et al. |
| 2007/0255785 A1 | 11/2007 | Hayashi et al. |
| 2007/0255807 A1 | 11/2007 | Hayashi et al. |
| 2008/0021870 A1 | 1/2008 | Birnbaum et al. |
| 2008/0152097 A1 | 6/2008 | Kent |
| 2008/0242277 A1 | 10/2008 | Chen et al. |
| 2008/0256170 A1 | 10/2008 | Hayashi et al. |
| 2008/0300982 A1 | 12/2008 | Larson et al. |
| 2009/0029674 A1 | 1/2009 | Brezina et al. |
| 2009/0136013 A1 | 5/2009 | Kuykendall et al. |
| 2009/0209241 A1 | 8/2009 | Karaoguz |
| 2009/0209286 A1 | 8/2009 | Bentley et al. |
| 2009/0215479 A1 | 8/2009 | Karmarkar |
| 2009/0216806 A1 | 8/2009 | Feuerstein et al. |
| 2009/0285372 A1 | 11/2009 | Barton et al. |
| 2010/0015976 A1 | 1/2010 | Issa et al. |
| 2010/0036912 A1 | 2/2010 | Rao |
| 2010/0095009 A1 | 4/2010 | Matuszewski et al. |
| 2010/0100937 A1 | 4/2010 | Tran |
| 2010/0153284 A1 | 6/2010 | Hoag et al. |
| 2010/0159967 A1 | 6/2010 | Pounds et al. |
| 2010/0251127 A1 | 9/2010 | Geppert et al. |
| 2010/0259190 A1 | 10/2010 | Aikala |
| 2010/0281113 A1 | 11/2010 | Laine et al. |
| 2010/0325113 A1 | 12/2010 | Valeski |
| 2011/0014932 A1 | 1/2011 | Estevez |
| 2011/0106857 A1 | 5/2011 | Besombe et al. |
| 2011/0274257 A1 | 11/2011 | Vaananen |
| 2013/0215116 A1 | 8/2013 | Siddique et al. |
| 2014/0123168 A1 | 5/2014 | Reisman |
| 2014/0123184 A1 | 5/2014 | Reisman |
| 2014/0123186 A1 | 5/2014 | Reisman |
| 2014/0123187 A1 | 5/2014 | Reisman |
| 2014/0130105 A1 | 5/2014 | Reisman |

FOREIGN PATENT DOCUMENTS

| | | |
|---|---|---|
| WO | 2009040706 | 4/2009 |
| WO | 2010053341 | 5/2010 |

OTHER PUBLICATIONS

Danah M. Boyd, et al.; Social Network Sites: Definition, History, and Scholarship; vol. 13; Issue 1; May 24, 2013; pp. 1-19.
Record interviews, empower your voice, Apr. 12, 2010-Sep. 13, 2010, 2009 Evoca LLC.
Darrell Etherington, "Facebook iPhone App Update Brings Push Notifications, Contact Sync," Jan. 6, 2010, gigaom.com.
Jessi Hempel, "The Second Coming of Facebook: How Mark Zuckerberg owned up to his mistakes and retooled his company to conquer smartphones," Fortune Magazine, Apr. 29, 2013, pp. 73-78.

CALLER ID SURFING

CROSS REFERENCE TO RELATED APPLICATION

This application is a continuation of U.S. application Ser. No. 12/774,312 filed on May 5, 2010, currently pending. This application is related to U.S. application Ser. No. 12/781,856 filed on May 18, 2010, which is a continuation of U.S. application Ser. No. 12/774,312. This application is related to U.S. application Ser. No. 13/695,540, which is a National Stage of PCT/FI2011/050293 filed on Apr. 6, 2011, which claims priority to U.S. application Ser. No. 12/781,856 filed on May 18, 2010 and U.S. application Ser. No. 12/774,312 filed on May 5, 2010. The entire contents of the above-identified applications are hereby incorporated by reference.

TECHNICAL FIELD OF INVENTION

The invention relates to the field of computer telephony integration. In particular the invention relates to displaying and producing computer based documents seamlessly to users that relate to their telephone calls, call log or electronic phone book.

BACKGROUND

Most of the work people do in developed economies these days pertain to using a computer and talking on the phone. Millions of people do it all the time at their office, and mobile phones have many functionalities associated with personal computers, such as color displays and text editors.

When people call each other, the caller can choose to send, and the recipient can choose to receive and display, a Caller ID. This caller ID is typically the phone number of the originating telephone subscription, but clever mobile phones also convert the Caller ID into a name, if the call originating number is found in the address book of the mobile phone under a certain name.

Furthermore, there are some directory enquiries companies that show the caller based on a lookup from a directory, and charge the consumer for these lookups. In addition to this EP 1 587 291 B1 discusses a method where the Caller ID can be enhanced by pushing more exotic multimedia data to the recipient of the call. US 2005/0069095 A1 on the other hand discusses finding the caller ID of the sender of a voicemail, by different methods of searching voicemails in order to discover the Caller ID. These documents are cited as references in this application.

These aforementioned methods have several disadvantages. The directory enquiry companies perform the lookup from a proprietary database and/or table, and deliver very limited, expensive information, typically limited to only the name registered to the telephone number in an SMS message for a fee of tens of cents per message. Adding more exotic broadband data to the Caller ID and pushing it to the recipients makes no sense, if there is no relevant data to push into terminals. Very few terminals are also compatible with broadband Caller ID, which would require standardization among mobile phone manufacturers that is difficult to achieve. Discovering the caller ID from a voicemail afterwards would not have helped during the missed call, quite obviously. A plain call log as in the prior art does not prepare the user to the eventual conversation in more detail either. Furthermore, the conventional phone book applications in subscriber terminals do not provide any useful recent background information for a call either, they only manage the contact information.

SUMMARY

The invention under study is directed towards a system and a method for effectively relieving all or some of the disadvantages mentioned earlier. The invention is directed towards automatically surfing on information networks by using Caller ID as the default surf board, i.e. search term.

More particularly the invention under study aims to realize a system where the mobile phone automatically does an Internet Search when the caller ID comes in, so that the person who answers the call has automatically "googled", i.e. done an Internet search of the person that calls him or her. It is now more pleasant to answer the call as the recipient knows what the caller has been up to, and has more issues to talk about.

A further object of the invention is to also present a system where the mobile phone searches and displays all or some relevant documents to the screen as the user enters or dials a recipient telephone number. The caller has less need of idling: "Now where were we?? What was going on last time?" as the correspondence with the person he is about to call is listed conveniently on the mobile phone screen. The mobile phone will display emails, text files, calendar events and the like right on the display or on the Desktop of the mobile phone as the user enters the numbers to be called or launches the call.

Many times the screen of the mobile phone is next to the ear or cheek, unless one uses a headset or a loudspeaker. One aspect of the invention involves a subscriber terminal that is comprised of a phone and a computer. The call information is relayed from the phone to the computer. For example a telephone or a mobile phone may be connected to a PC via radio path or cable, and the Desktop of the PC is arranged with search results from the file system of the PC or the Internet, where the Caller ID, outgoing telephone number, or any data associated to them, are used as search input terms. In an office environment, the telephone of the user is ideally connected to the PC by a cable or a wireless link, such as a Bluetooth link. As a call incomes, and the caller is recognized, the email application searches and displays the emails the user has had with the caller, any Word documents that mention the caller's name, or it automatically logs on to the user's and/or caller's home page, and/or social media profile page, such as a Facebook profile page and/or LinkedIn, Twitter and/or Plaxo profile page.

Another embodiment of the invention allows the Caller ID for people to work in workgroups in a novel and inventive way. Now, with reference to earlier paragraph, the user gets a call from +3589123456, from Charlie Lahti, a fictitious person from Finland, as evidenced by the International dialing code. Charlie has just bought his 5 year old daughter Liisa a new bicycle, and posts a picture of Liisa enthusiastically pedaling the new bike on his Facebook page. Now, the user, let's call him Matti, and Charlie are friends on Facebook, and as the user's mobile phone receives and recognizes the call from Charlie, the user's mobile phone logs on to Facebook if it is not logged in already and searches and displays Charlie's profile, which has the picture of Liisa pedaling the new bike. "Wow, that's a pretty awesome bike Liisa has there", the user remarks to the phone, before Charlie manages to say anything. There is no need for "How is the weather there?—enough with the pleasantries—How's things?" or the usual nonsensical warm-up in pursuit of interesting things to talk about. Liisa's new bike makes the psychological connection immediately between Charlie and the user, and a common but personal frame of mind for the conversation has been entered.

Now Charlie really likes the fact that the user knows and is interested in things that happen to his family, and decides spontaneously to suggest a picnic in a park to the user. The user and Charlie engage in planning the picnic, and then the user presses a button from his subscriber terminal to begin recording the conversation. The conversation about planning the picnic is recorded, typically into a data file, and this file is posted on the Facebook "wall" of the user and Charlie. Typically the recorded conversation file is posted so that the user records the data file on his subscriber terminal and then uploads the file to Facebook, and posts it to the wall between the user and Charlie. Of course live streaming to a file on the Facebook "wall" is also possible in accordance with the invention. The wife of Charlie or the girlfriend of the user can now access the voice recording from the Facebook page, and check out what Charlie and the user planned by listening to the voice recording. Speech recognition may also be used by either user's or Charlie's subscriber terminal or a network computer to extract the voice recording into text, which may also be posted on the "wall" between the user and Charlie. Of course if the user and Charlie use a video phone both visual and audio data may be recorded to the data file in accordance with the invention.

More advantages further still are accrued by embodiments of the invention with the network effect. Now Charlie calls his wife, who has a mobile phone and is a user of the invention. Charlie's incoming phone call is recognized by his wife's mobile phone, which log's onto Facebook and displays Charlie's Facebook profile page which has a voice recording in a file and a text excerpt extracted from the phone conversation: "Maybe we should get garlic baguettes, white wine for the picnic". Charlie's wife is in a shop and notices the incoming call and observes the "wall" postings between Charlie and Matti, the earlier user, as it is flashed with the Caller ID on the screen. She replies to the phone: I'll get the wine and the baguettes, but I am busy now!", and disconnects the call to his husband Charlie, before Charlie can say anything. Charlie did not really have anything else to say at this time, besides the things he already discussed with Matti, so he is quite relieved that he does not need to start pondering: what did I agree with Matti?, to his wife who has tens of other things to buy from the shop.

The invention adds "bandwidth", i.e. speed, efficiency and more dimensions to personal communication, as the users of the inventive system can also visually see by documentation what is going on in the relationship between two or more people.

Quite clearly, the invention can be used in business communication. In one aspect of the invention executives, bankers and attorneys that are working on a corporate merger and acquisition deal form a closed group, for example in a corporate intranet, or on LinkedIn or a like social network. The lawyers can get term sheet information necessary for preparing agreements from recorded teleconferences between executives without calling them, and they are also better prepared to take instructions from the executives when the executives call them and give new orders, because the lawyers get a text excerpt displayed to them of what the executive has been doing as they answer the call.

In another aspect of the invention the caller is a customer and the answering party is a call center agent and the caller identity is used to search and retrieve all or some of the customer account details to the workstation of the call center agent. This avoids the call center agent needing to ask questions like: "what is your customer account number? Please spell your name? What is your birth date?" and the like. The customer account details automatically pop up on the screen of the workstation as the call of the user is received.

In this patent application a subscriber terminal means a terminal device in a network, such as a mobile phone, telephone and/or computer. Also in some embodiments of the invention the subscriber terminal can be formed by two or more devices that themselves are subscriber terminals or peripherals to a subscriber terminal. For example a telephone and a workstation computer can be used together when they are connected with a communication link as explained earlier. The call recipient can be entered by choosing a call recipient from a contact application in a mobile phone and/or computer, by voice recognition, and/or by entering the actual phone number of the recipient's subscribed line in embodiments of this invention.

In this application a social network site means any site such as Facebook, LinkedIn, Plaxo, Twitter or the like, where people can effectively communicate in workgroups.

A corporate and/or social intranet/Internet workgroup would also classify as a social network site for the purposes of this application.

"A wall" is an identified communication space between the caller and the call recipient on a social network, such as Facebook, for example, or any other social network.

The Caller ID primarily refers to the originating and/or destination telephone number information sent in the telephone network. However, some calls are IP or packet switched based, and might originate from a device or try to reach a device that does not have a telephone number assigned to it or does not use that telephone number. In these instances whatever caller identity information is used to substitute the originating and/or destination telephone number, such as username, IP address, email address or the like, will be construed as the Caller ID in accordance with the invention in this application.

A search engine is in accordance with the invention and is characterized in that, the search engine is arranged to receive an automatic input of Caller ID, or data derived from Caller ID, from a subscriber terminal and/or telephony network as a search term, and the said search engine is arranged to execute a search of at least one electronic document using at least one said search term and display at least one said search result on a screen.

A subscriber terminal in accordance with the invention is characterized in that the subscriber terminal is arranged to send an automatic output of Caller ID, or data derived from Caller ID, to a search engine as a search term and display at least one search result returned from said search engine.

By an automatic input or output we mean a machine generated input or output of Caller ID or data derived from Caller ID which does not require human data entry at all in some embodiments, or only an approval or selection of a machine generated input or output in accordance with the invention. Quite clearly this is different to keyboard text or number string entry or electronically copying and pasting Caller ID by a mouse as could currently be done in the prior art. In preferable embodiments of the invention all or some of the steps or processes of the invention are automatic.

A method for displaying information in at least one subscriber terminal is in accordance with the invention and characterized in that, at least one incoming call arrives and/or at least one call recipient for an outgoing call is entered to the said subscriber terminal, the identity of the incoming call caller and/or the outgoing call recipient is identified, the said identity of the incoming and/or outgoing call is entered as a search term into at least one search engine program on the subscriber terminal and/or on at least one network computer, the said at least one search engine program searches the file system of the subscriber terminal and/or the Internet with said at least one search term, the results of the said search are displayed on at least one said subscriber terminal screen as the recipient of an outgoing call is selected, as the call is incoming and/or outgoing, as the call is answered, and/or during the call.

A subscriber terminal in accordance with the invention is characterized in that, at least one incoming call is arranged to arrive and/or at least one call recipient of an outgoing call is arranged to be entered to the said subscriber terminal, the identity of the incoming call caller and/or the outgoing call recipient is arranged to be identified, the said identity of the incoming and/or outgoing call is arranged to be entered as a search term into at least one search engine program on the subscriber terminal and/or on at least one network computer to which the subscriber terminal is arranged to be connected, the said at least one search engine program is arranged to search the file system of the subscriber terminal and/or the Internet with said at least one search term, the results of the said search are arranged to be displayed on at least one said subscriber terminal screen as the recipient of an outgoing call is selected, as the call is incoming and/or outgoing, as the call is answered, and/or during the call.

In some embodiments of the invention all or some of the aforementioned steps are conducted automatically. A preferred embodiment of the invention automatically enters the identity of the incoming call caller and/or the outgoing call recipient as a search term, but requests the user a permission to conduct the search. In a more streamlined embodiment, the search is also conducted as soon as the search term is obtained, and the user is returned at least one search result without any input requirement when the method of the invention is operating. This applies also to the subscriber terminal, software program product and/or telecommunication system of the invention.

A telecommunication system in accordance with the invention is characterized in that, at least one incoming call is arranged to arrive and/or at least one call recipient of an outgoing call is arranged to be entered to the said subscriber terminal, the identity of the incoming call caller and/or the outgoing call recipient is arranged to be identified, the said identity of the incoming and/or outgoing call is arranged to be entered as a search term into at least one search engine program on the subscriber terminal and/or on at least one network computer to which the subscriber terminal is arranged to be connected, the said at least one search engine program is arranged to search the file system of the subscriber terminal and/or the Internet with said at least one search term, the results of the said search are arranged to be displayed on at least one said subscriber terminal screen as the recipient of an outgoing call is selected, as the call is incoming and/or outgoing, as the call is answered, and/or during the call.

A memory unit comprising a software program product in accordance with the invention is characterized in that, at least one incoming call and/or at least one call recipient of an outgoing call is arranged to be detected by the software program product, the identity of the incoming call caller and/or the outgoing call recipient is arranged to be identified by the software program product, the said identity of the incoming call caller and/or the outgoing call recipient is arranged to be entered as a search term into at least one search engine program on the subscriber terminal and/or on at least one network computer to which the subscriber terminal is arranged to be connected by the software program product, the said at least one search engine program is arranged to search the file system of the subscriber terminal and/or the Internet with said at least one search term, the results of the said search are arranged to be displayed on at least one said subscriber terminal screen as the recipient of an outgoing call is selected, as the call is incoming and/or outgoing, as the call is answered, and/or during the call by the software program product.

A software program product in accordance with the invention is characterized in that, at least one incoming call is arranged to arrive and/or at least one call recipient of an outgoing call is arranged to be detected by the software program product, the identity of the incoming call caller and/or the outgoing call recipient is arranged to be identified by the software program product, the said identity of the incoming call caller and/or the outgoing call recipient is arranged to be entered as a search term into at least one search engine program on the subscriber terminal and/or on at least one network computer to which the subscriber terminal is arranged to be connected by the software program product, the said at least one search engine program is arranged to search the file system of the subscriber terminal and/or the Internet with said at least one search term, the results of the said search are arranged to be displayed on at least one said subscriber terminal screen as the recipient of an outgoing call is selected, as the call is incoming and/or outgoing, as the call is answered, and/or during the call by the software program product.

A network computer server in accordance with the invention is arranged to be in connection with at least one subscriber terminal and is characterized in that, the identity of an incoming call caller to a subscriber terminal and/or an outgoing call recipient in a subscriber terminal is arranged to be identified by the network computer server, the said identity of the incoming call caller and/or the outgoing call recipient is arranged to be entered as a search term into at least one search engine program on the subscriber terminal and/or the network computer server, the said at least one search engine program is arranged to search the file system of the subscriber terminal and/or the Internet with said at least one search term, the results of the said search are arranged to be displayed on at least one said subscriber terminal screen as the recipient of an outgoing call is selected, as the call is incoming and/or outgoing, as the call is answered, and/or during the call by the software program product.

A subscriber terminal is in accordance with the invention and characterized in that, the subscriber terminal comprises a call log and/or contacts directory software application and at least one call log and/or contacts directory entry is arranged to be displayed on the screen of the subscriber terminal with at least one search result obtained with using the Caller ID of said entry and/or any data derived thereof as a search term.

Caller ID was explained earlier in the application. In above by "data derived thereof", i.e. of Caller ID, we mean other data that are with the Caller ID in the entry, such as name, organization, email address or the like, or any data that can be derived from this data, such as the combination: Charles Lahti (name), and/or Nordea Bank (organization), and/or +3589123456 (Caller ID) or some other combination, synonym or permutation thereof. This applies also to the below telecommunication system and software program product embodiments in some embodiments.

A telecommunication system in accordance with the invention is characterized in that, the telecommunication system comprises a call log and/or contacts directory software application and at least one call log and/or contacts directory entry is arranged to be displayed on the screen of a subscriber terminal with at least one search result obtained with using the Caller ID of said entry and/or any data derived thereof as a search term.

A software program product is in accordance with the invention and characterized in that, the software program product comprises a call log and/or contacts directory software application and at least one call log and/or contacts directory entry is arranged to be displayed on the screen of a subscriber terminal with at least one search result obtained with using the Caller ID of said entry and/or any data derived thereof as a search term.

A subscriber terminal in accordance with the invention is characterized in that, the subscriber terminal comprises a call log and/or contacts directory software application, and at least one call log and/or contacts directory entry is arranged to be displayed on the screen of the subscriber terminal with at least one social network page and/or data derived thereof associated with said call log entry.

A telecommunication system in accordance with the invention is characterized in that, the telecommunication system comprises a call log and/or contacts directory software application, and at least one call log and/or contacts directory entry is arranged to be displayed on the screen of the subscriber terminal with at least one social network page and/or data derived thereof associated with said call log and/or contacts directory entry.

A software program product in accordance with the invention is characterized in that, the software program product comprises a call log and/or contacts directory software application, and at least one call log and/or contacts directory entry is arranged to be displayed on the screen of a subscriber terminal with at least one social network page and/or data derived thereof associated with said call log entry.

In addition and with reference to the aforementioned advantage accruing embodiments, the best mode of the invention is considered to be the use of the invention with social media, such as Facebook, where the mobile station searches for the social media page of the caller based on the Caller ID and derivations thereof and displays it to the recipient of the call on the mobile station screen, possibly with other Internet search results.

BRIEF DESCRIPTION OF THE DRAWINGS

In the following the invention will be described in greater detail with reference to exemplary embodiments in accordance with the accompanying drawings, in which FIG. 1 demonstrates an embodiment 10 of the inventive document search and display method with an incoming call as a flow diagram.

Some of the embodiments are described in the dependent claims.

DETAILED DESCRIPTION OF EMBODIMENTS

Figure 1:
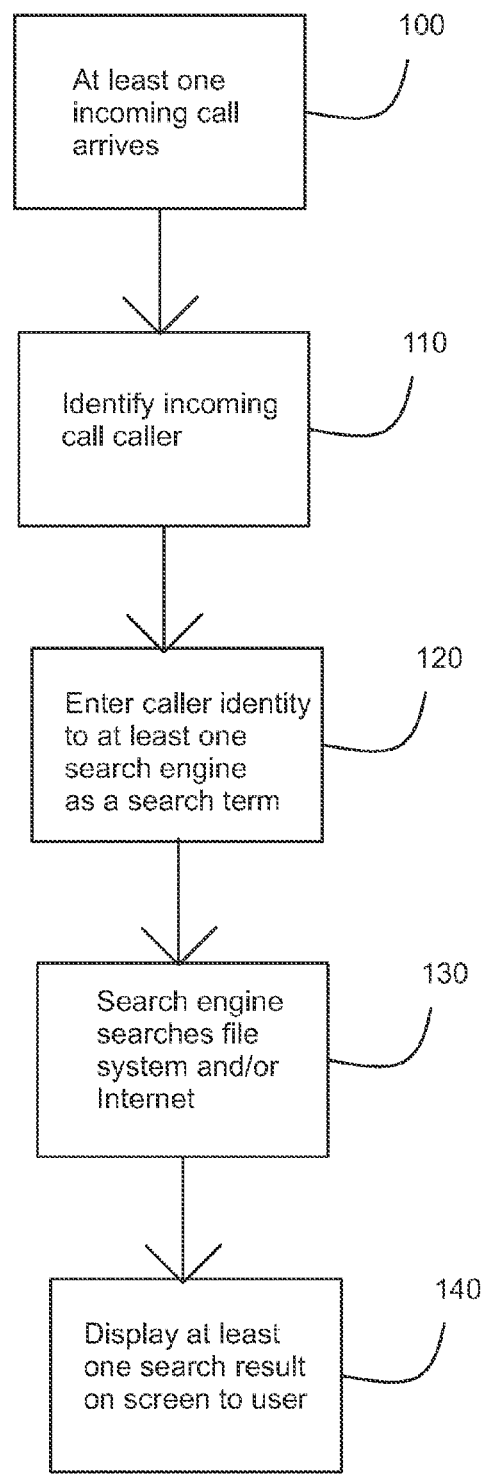

FIG. 1 shows the method of the invention when a call is inbound to the subscriber terminal of the user. In phase 100 at least one call arrives at the subscriber terminal. The subscriber terminal is typically a mobile phone, but can in principle be any device connected to a phone line. In phase 110 the caller is identified, typically by the Caller ID, i.e. the telephone number from which the caller called. Furthermore, as the Caller ID is received, the subscriber terminal may match it with a name in the contact book application of the subscriber terminal. The telephone number, name of caller, organization of caller and the like are identified as the identity of the caller in phase 120. For example if telephone number+3589123456 belongs to an entry named Charles Lahti in the contact book application, that is associated with a work organization of the name Nordea Bank in the contact book application, the identity of the caller will be "+3589123456, Charles Lahti, Nordea Bank" and/or any permutation thereof in accordance with the invention.

In phase 120 all or some of the terms: "+3589123456, Charles Lahti, Nordea Bank are entered into at least one search engine as a search term. In some embodiments other search terms, such as contextual search terms like the user's name, company, location, time or the like, may also be entered as search terms in addition to at least one caller identity term. The search engine may be search engine software on the subscriber terminal itself, or it may also be located on the Internet to which the subscriber terminal is advantageously connected in some embodiments of the invention.

In phase 130 the search engine searches the file system of the subscriber terminal and/or remote computer and/or the Internet using the aforementioned search terms. While searching, the search engine will also typically retrieve matching results to the subscriber terminal or to a network server to which the subscriber terminal is connected to in some embodiments of the invention.

In phase 140 the search results are shown on the screen to the user. Calling people is a very time sensitive activity, i.e. there is a great amount of contextual significance that is attached to when you call, or to the "now". Therefore in some embodiments of the invention the search engine will rank the search results based on how recent they are. Therefore the search engine will show the file from the file system with which the user and the caller last worked together, and/or the recent online activity that the caller has performed in some embodiments.

Preferably, the search will be conducted and the search results will be displayed automatically as the Caller ID is retrieved. This way the user gets to glance at the activities of the person calling him as the phone rings and the search results are shown seamlessly on the phone screen.

In some embodiments of the invention it is of course possible that the search is conducted over a corporate intranet to facilitate workgroup type behavior between employees that work together. As the employees see what each other are doing virtually, it is easier for them to work in a group.

In some embodiments of the invention any of the following applications perform the search for and display of the search results together or separately: an email program searches emails, an internet browser uses a search engine toolbar and/or search engine internet site and searches websites, a file system search engine searches at least one file system for files.

It should be noted that any features, phases or parts of the method 10 can be freely permuted and combined with embodiments 20, 30, 40, 50, 60, 70, 80 and/or 90 in accordance with the invention.

Figure 2:
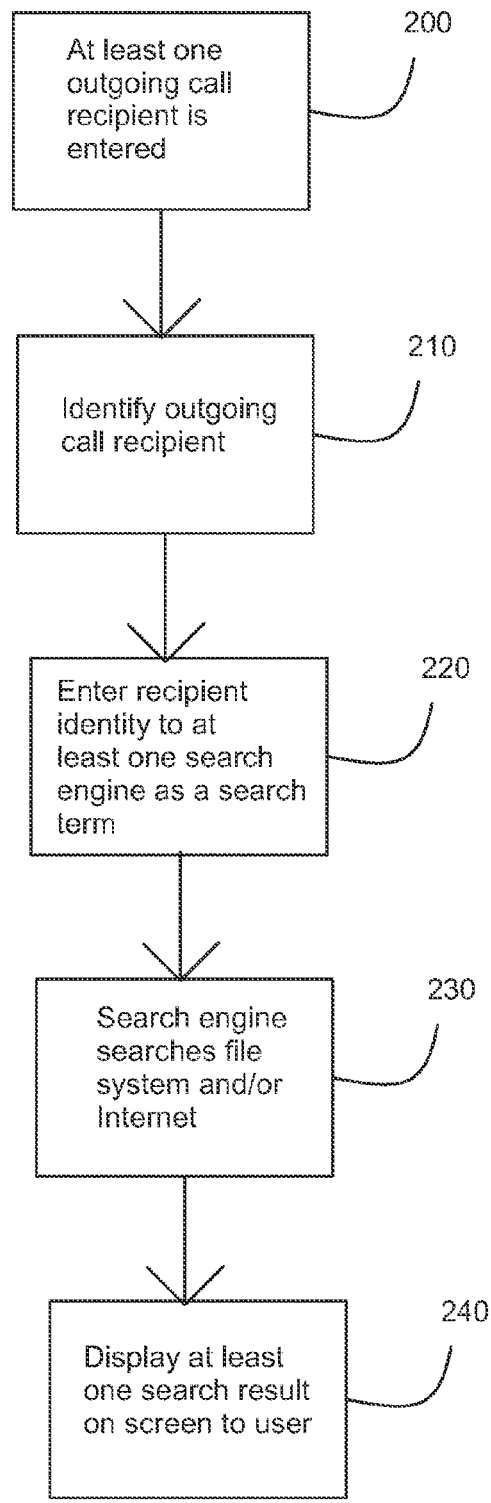
FIG. 2 demonstrates an embodiment 20 of the inventive document search and display method with an outgoing call as a flow diagram.

FIG. 2 displays an embodiment 20 of the invention that is useful when people make calls. In phase 200 at least one outgoing telephone number is entered to the subscriber terminal. The user typically enters the telephone number by keyboard entry or voice recognition in some embodiments of the invention. In phase 210 the number to be called is identified and any data associated with this number is identified. For example, if the number entered is +3589123456, the number of fictitious person Charles Lahti with the organization Nordea Bank in the electronic phone book of the subscriber terminal, the identity of the call recipient is identified as "+3589123456, Charles Lahti, Nordea Bank" or any permutation, derivation, synonym, translation or combination thereof. Permuted and modified search terms in accordance with the invention could be for example "Charles or Lahti and Nordea Bank or Nordea Pankki", where "Pankki" is the Finnish translation of "Bank".

In phase 220 the recipient identity is entered to at least one search engine as a search term. In some embodiments other search terms, such as contextual search terms like the user's name, location, time, company or the like, may also be entered as search terms in addition to at least one recipient identity term. In phase 230 the search engine, which may reside on the subscriber terminal, network computer, or be distributed between the two, is used to search the file system and/or the Internet. In phase 240 at least one search result is displayed to the user. This way the user can check what the call recipient has been up to prior to the call with a simple glance at the subscriber terminal screen. In some embodiments of the invention, the subscriber terminal logs the user automatically into social network sites, such as Facebook, LinkedIn, Twitter or the like, because it is quite likely that the most recent Internet based activity of the call recipient is found from these or similar web sites.

In some embodiments of the invention it is of course possible that the search is conducted over a corporate intranet to facilitate workgroup type behavior between employees that work together. As the employees see what each other are doing virtually, it is easier for them to work in a group.

In some embodiments of the invention any of the following applications perform the search for and display of the search results together or separately: an email program searches emails, an internet browser uses a search engine toolbar and searches websites, a file system search engine searches the file system for files.

It should be noted that any features, phases or parts of the method 20 can be freely permuted and combined with embodiments 10, 30, 40, 50, 60, 70, 80 and/or 90 in accordance with the invention.

Figure 3:
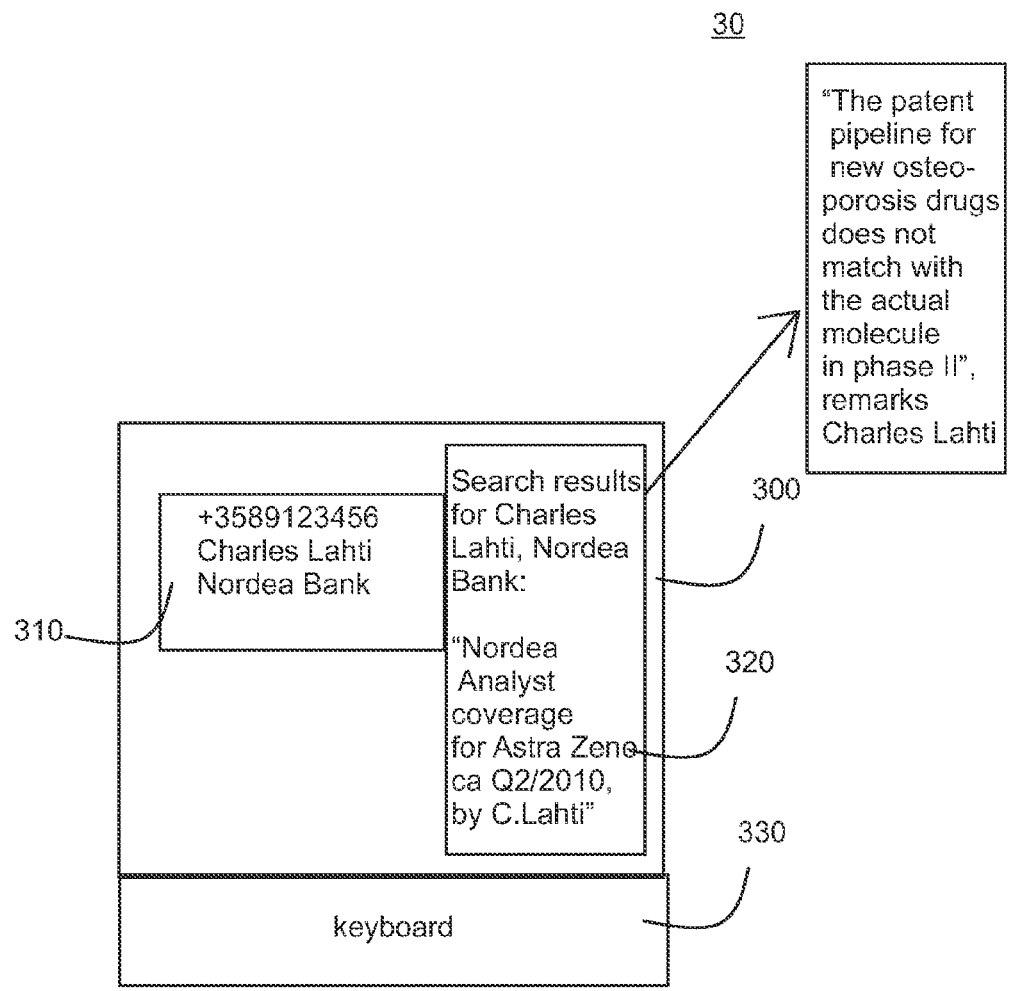
FIG. 3 demonstrates an embodiment 30 of the mobile station subscriber terminal in accordance with the invention.

FIG. 3 shows an embodiment 30 of a subscriber terminal in accordance with the invention. The subscriber terminal is a mobile phone or a mobile station with a screen 300 and a keyboard 330. The mobile phone of the invention works as follows: at least one incoming call is arranged to arrive and/or at least one outgoing call is arranged to leave from the said mobile phone, and the number of that call is displayed in the screen section 310. In some embodiments of the invention the telephone number gets also translated to a name and/or organization from the contact book application of the mobile phone. In this example the number+3589123456 is translated to Charles Lahti, whose organization happens to be Nordea Bank, which is also displayed in screen section 310. Now as the telephone number+3589123456 is entered, or Charles Lahti selected from the contacts book application, a search is arranged to be conducted on a search engine. The search engine is in the mobile phone and/or over the network and/or Internet and the search terms used are "+3589123456, Charles Lahti, Nordea Bank" or any permutation, derivation, synonym or combination thereof.

Similarly the identity of the incoming call caller is arranged to be identified. If the number+3589123456 calls to the subscriber terminal, the number is recognized and the corresponding contact details in the contact application are shown, for this number Charles Lahti, Nordea Bank. Similarly the search terms used by the search engine are "+3589123456, Charles Lahti, Nordea Bank" or any permutation, derivation, synonym or combination thereof.

The search results are shown in screen section 320, and as Charles Lahti is an analyst for Nordea Bank his report on the Swedish-Anglo drug company AstraZeneca pops up first. This search result is shown to the user of the mobile phone 30.

In one practical embodiment of the invention the mobile phone 30 is a Google Android mobile phone, which is arranged to be connected to the Google Search Engine. The Google search engine is integrated with the Google Android phone, and the user of the mobile phone gets shown automatic search results based on the Caller ID's of outgoing and incoming calls to and from the mobile phone. This way the need for any directory enquiries services is removed. This is what can be called "Caller ID surfing" of the Internet, as the name of the title of this application suggests. Of course any other mobile phone or search engine could be similarly integrated in accordance with the invention.

Quite clearly another practical embodiment of the invention could be realized with Microsoft Bing search engine, a Microsoft operating system or Internet browser enabled phone, and also possibly the Microsoft social network "Windows Live Planet". In one of these practical embodiments involving Microsoft solutions as components, the Microsoft operating system or Internet- or file system browser would recognize an outgoing and/or incoming caller ID, then search for documents with Bing using the Caller ID or any data derived thereof as at least one search term. Additionally if the Caller ID or any data derived thereof would be associated with any profile page in Windows Live Planet, the Microsoft systems could be interfaced so that the Windows Live Planet profile page is displayed with the Caller ID of an outgoing and/or incoming call.

In one embodiment the whole contacts directory of a mobile station can be replaced with the social network user local copy. For example a Windows Live planet mobile phone would simply have the user use his Windows Live Planet account as his contacts directory in the mobile phone.

In one particular embodiment the call log application of a mobile phone or subscriber terminal is integrated with the invention so that any missed calls or past calls are associated with search results and/or social network profile pages of parties that have called the user or the user has called in the past. For example in one embodiment screen section 310 could be used to show at least one missed call or at least one past call, and screen section 320 could be used to show the search results. In some embodiments the call log application is replenished with search results associated with Caller ID's automatically as the subscriber terminal is used. A software on a mobile phone can do the said searches and/or an Internet server such as a search engine can do the searches and replenish the search results in accordance with the invention.

In some embodiments of the invention at least one social network application such as Facebook or Windows Live planet are integrated with the call log and/or contacts directory software of a mobile phone so that there is a direct translation of Caller ID's in the call log and or contacts directory with telephone numbers listed in the social network user profiles. In some embodiments there is a direct translation between telephone numbers in user profiles of social networks and/or Caller ID's of incoming and/or outgoing calls and/or telephone numbers entered and/or selected as call parties for an intended call.

In some embodiments of the invention when there are no sufficiently relevant search results the system will display "Call party not identified" or a similar message. In some embodiments of the invention when the call party is identified, but the party has denied the broadcast of its identity, "unknown call party" or "call party information denied" could be displayed, for example in screen section 320. Quite clearly there can also be more than two screen sections in accordance with the invention.

An important aspect of the invention is that when we are surfing and searching the Internet with Caller ID data and derivations thereof, we are essentially surfing & searching the Internet for people. Therefore, in one preferable embodiment, the search engine not only lists and ranks the search results but also opens the most relevant search results. It is quite unpractical to read the actual Nordea analyst coverage of Astra Zeneca Q2/2010 by Charles Lahti. What the user is most probably interested in is the contribution of Charles Lahti to this report. In one preferable embodiment of the invention at least one search result is opened and the screen portion 320 is arranged to display that portion of the search result that actually features the search terms. The fictitious search result featured a quote "The patent pipeline for new osteoporosis drugs does not match with the actual molecule in phase II, remarks Charles Lahti", and the mobile phone software and/or search engine software now displays that quote in the screen section 320. Quite clearly the call log and contact directory embodiments can also be arranged to display the portions of the search results that feature the search terms as explained before in accordance with the invention.

Now assume the user is an AstraZeneca employee. The user of the mobile phone might have a contextual search term "AstraZeneca" set in some embodiments of the invention. Therefore the analyst coverage report is ranked first, and its relevant quote is displayed on the screen as the user is speaking, answering or about to make a call with the mobile phone 30 in accordance with the invention. For an AstraZeneca employee it might be useful to know that Charles Lahti has concerns over their company's patents.

In all embodiments of the invention the search method of the inventor described in U.S. Ser. No. 12/758,258 can be used and this document is incorporated into this application as reference. The said at least one search engine program is arranged to search the file system of the subscriber terminal and/or the Internet with said at least one search term but may add contextual ranking and/or contextual terms to the search in accordance with the invention. In one embodiment the search engine does a synonym expansion of at least one search term, searches the documents with this expanded search term set, and then ranks the results contextually as described in Ser. No. 12/758,258.

The results of the said search are arranged to be displayed on at least one said subscriber terminal screen section 320 as the recipient of an outgoing call is selected, as the call is incoming and/or outgoing, as the call is answered, and/or during the call.

It should be noted that any features, phases or parts of the subscriber terminal 30 can be freely permuted and combined with embodiments 10, 20, 40, 50, 60, 70, 80 and/or 90 in accordance with the invention.

Figure 4:
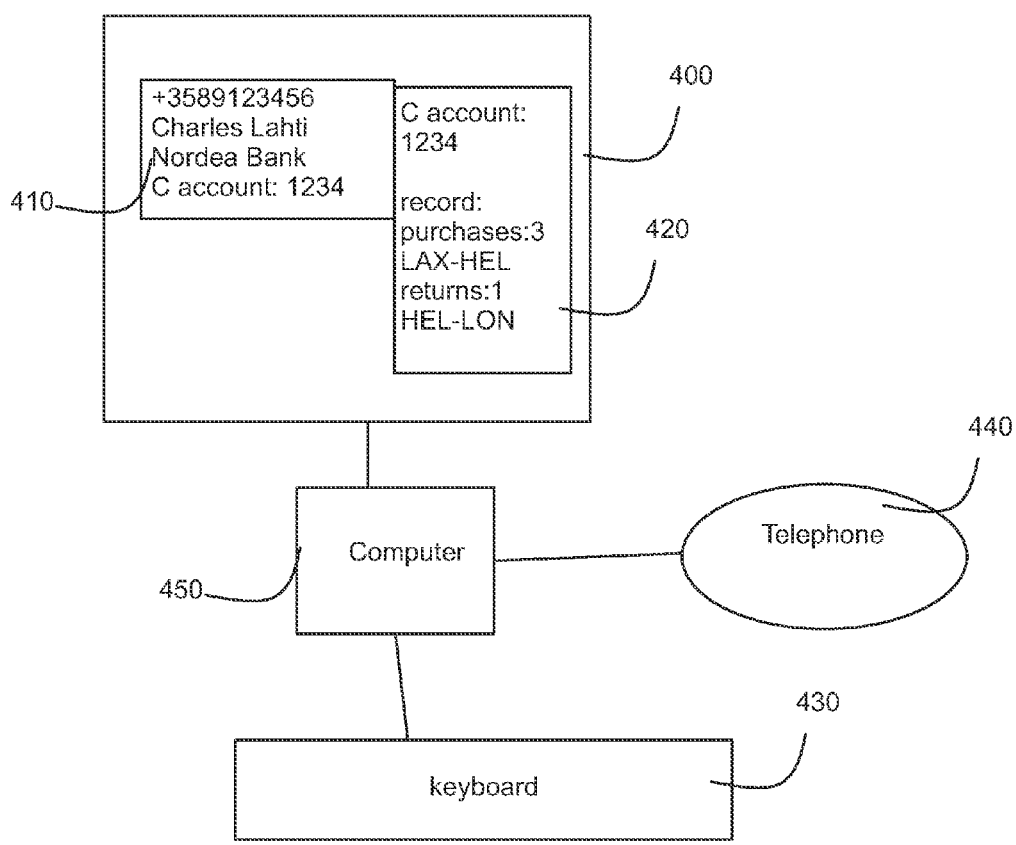
FIG. 4 demonstrates an embodiment 40 of the subscriber terminal composed of a separate computer and a telephone in accordance with the invention.

FIG. 4 shows an embodiment 40 of the invention where the subscriber terminal is a Desktop computer, such as a PC, and a telephone. In some embodiments of the invention the caller is a customer and the answering party is a call center agent and the caller identity is used to search and retrieve all or some of the customer account details to the workstation display of the call center agent.

As the call comes in to the telephone 440, the Caller ID data is relayed to the computer 450. In some embodiments the telephone 440 and the computer 450 are connected with a cable or a wireless radio link, such as Bluetooth. In some embodiment of the invention there is no telephone, and the computer is merely connected to the phone line and has a microphone and loudspeakers and/or a headset for talking on the phone line.

In some embodiments of the invention the computer has customer details stored that also include the telephone number of the customer. As the computer retrieves the incoming call Caller ID the computer searches for customer entries stored on the computer that have that telephone number. In this embodiment the incoming call has a Caller ID +3589123456, and the computer finds that this telephone number is associated with Charles Lahti, who works in the Nordea Bank and has a customer account number 1234. These details are shown to the call center agent in screen section 410.

In a preferable embodiment of the invention, the computer now knows the customer account number and opens this relevant customer account to the call center agent in screen section 420. Now, even before answering to the call the call center agent knows that Charles Lahti is a regular client flying to Los Angeles from Helsinki several times, but has not used one Helsinki-London flight, but would have been entitled to use it.

The call center agent is not greatly surprised when Charles Lahti inquires about a refund over the telephone concerning the HEL-LON flight. The call center agent can immediately move on to process the refund query in the returns section of the customer account program displayed in screen section 420 in accordance with the invention.

Quite clearly the same workstation embodiment 40 can also be used when people place outbound calls. In this embodiment it is only the outbound Caller ID that is used as the basis for the search in obtaining data records.

It should be noted that any features, phases or parts of the embodiment 40 can be freely permuted and combined with embodiments 10, 20, 30, 50, 60, 70, 80 and/or 90 in accordance with the invention.

Figure 5:
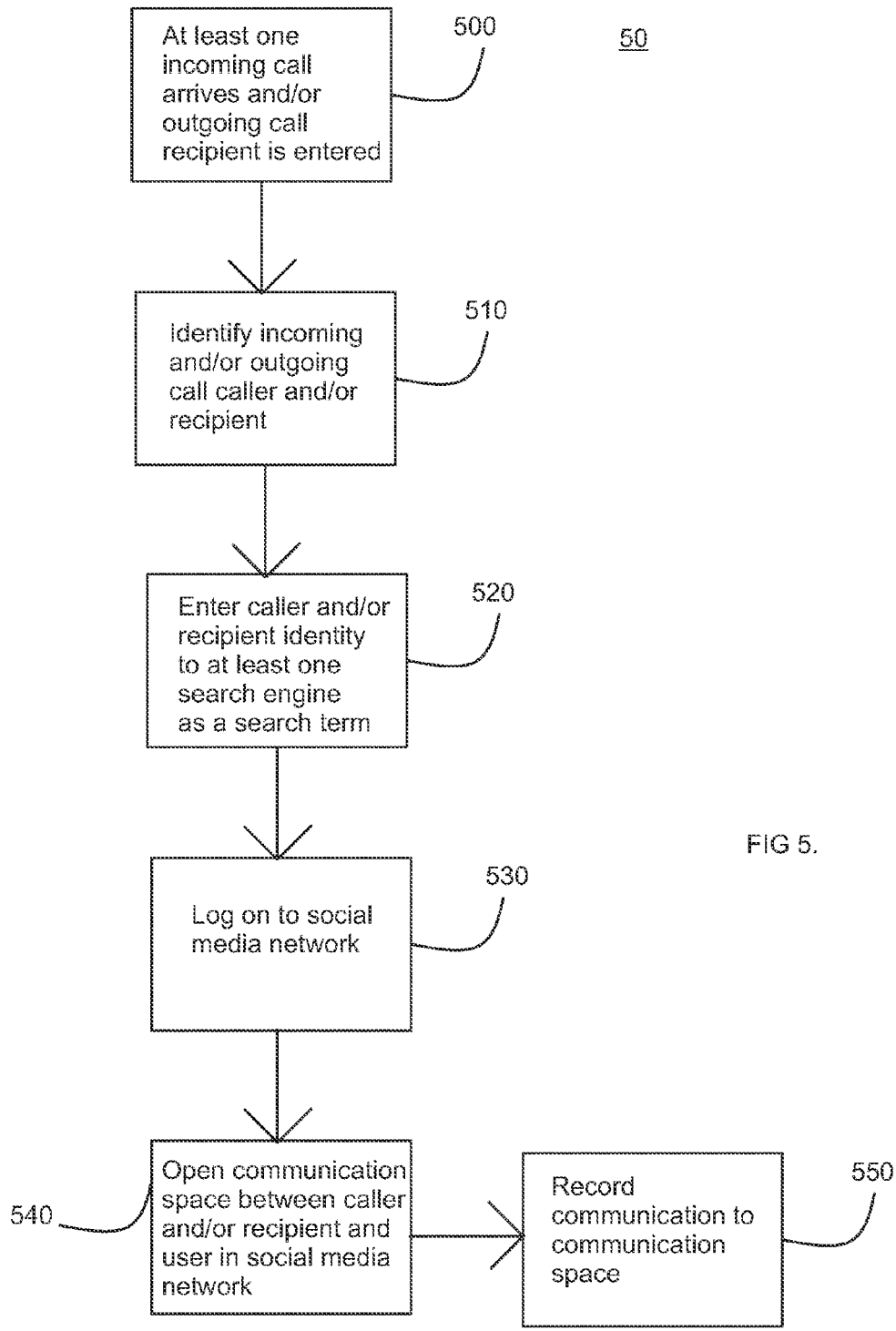
FIG. 5 demonstrates an embodiment 50 of the inventive document search display and production method for calls adapted to social media as a flow diagram.

FIG. 5 shows an embodiment 50 of the invention that utilizes social network websites and/or services and/or corporate intranets. In phase 500 at least one incoming call arrives and/or outgoing telephone number is entered. In phase 510 the incoming call caller and/or the outgoing call recipient are identified, by the Caller ID, i.e. telephone number, and also possibly, name, organization or any other info that is related to the number in the contacts application of the subscriber terminal. In phase 510 at least one caller and/or call recipient identity is entered to at least one search engine as a search term. In phase 530 the subscriber terminal logs the user onto a social media network, such as Facebook, LinkedIn or the like.

It should be noted that the phases of embodiment 50 are not necessarily in chronological order. This also applies to all other method embodiments of this application. The phases might be executed in a different temporal order and/or concurrently in accordance with the invention. All method steps of the invention can also be executed automatically, or completely without any user involvement while the method is operating in some embodiments of the invention. Some method steps can be executed manually in some embodiments of the invention.

Now in preferable embodiments of the invention the search engine searches at least one social network site, or uses a search facility on that site with the Caller ID associated search terms. In some embodiments of the invention, the aim is to search the profile page of the caller and/or call recipient and display the said profile page to user.

In phase 540 the subscriber terminal opens a communication space between the user and the caller and/or recipient in the social network. Now one of the subscriber terminals used in the call is automatically logged to an on-line conversation facility between the user and the other call participant. In phase 550 the subscriber terminal records all or some part of the call into a data file and uploads the data file to a social network site, and posts the data file to a space identified as a communication space between the caller and the call recipient. In some embodiments of the invention the user and the caller and/or recipient may exchange text or image messages that are also recorded to the communication space in accordance with the invention. In some embodiments of the invention the call is recorded in a voice and/or video data file to the communication space and speech recognition is used to extract text extracts from the recorded voice and/or video data file.

It should be noted that any features, phases or parts of the method 50 can be freely permuted and combined with embodiments 10, 20, 30, 40, 60, 70, 80 and/or 90 in accordance with the invention.

Figure 6:
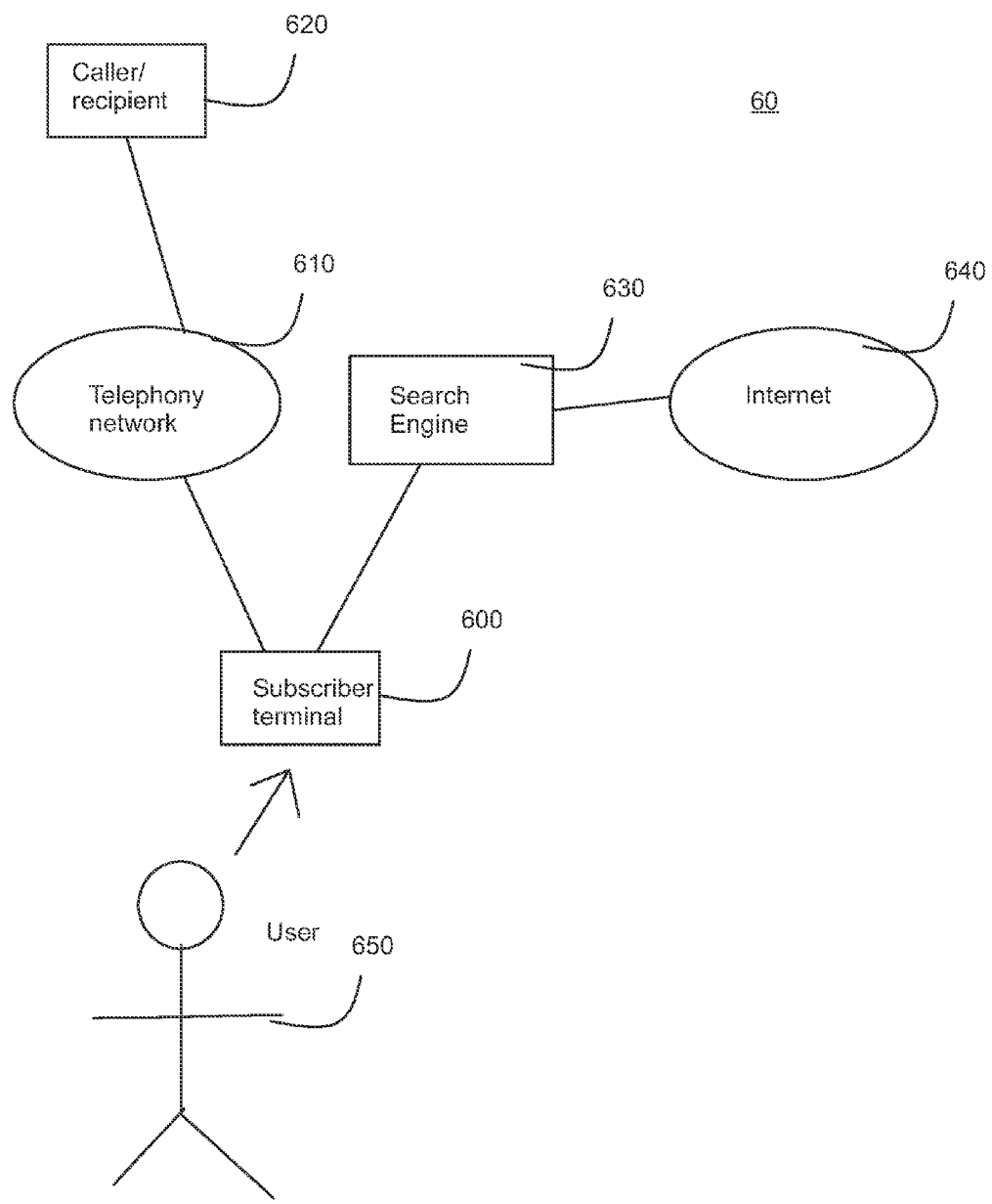
FIG. 6 demonstrates an embodiment 60 of the inventive document search display and production method for calls as a network block diagram.

FIG. 6 shows a system embodiment of the invention as a network. The user 650 uses the subscriber terminal 600 to place calls and receive calls. The subscriber terminal is typically connected to the Internet 640 and a Search Engine 630 by means of a communication connection, which may be a wireless data connection such as a WLAN-, GPRS-, 3G-, 4G- and/or WCDMA connection or a cable connection like an Ethernet connection or similar connection. The Caller ID received through the Telephony network 610 or by entry to the subscriber terminal 600 is used to recognize the identity of the caller when the user is receiving a call and/or the intended call recipient when the user is about to make a call. The Caller ID and any identity data associated with it are then used to define the search terms in accordance with the invention.

The subscriber terminal 600 uses a search engine 630 residing in the subscriber terminal or in the network to search the file system of the subscriber terminal or the Internet 640 or any other communication network with the search terms derived from the Caller ID and associated identity data. The search results are then displayed to the user. Showing the relevant documents about the caller helps the user with useful background information from the caller when he is answering calls. Similarly, showing the relevant search result documents about the potential call recipient prior to launching the actual call helps the user in choosing his topics and words when he begins speaking and makes the call.

In one practical embodiment of the invention the subscriber terminal 600 is a Google Android mobile phone, which is arranged to be connected to the Google Search Engine 630. The Google search engine is integrated with the Google Android phone, and the user 650 of the mobile phone gets shown automatic search results based on the Caller ID's, or any data derived thereof, of outgoing and incoming calls to and from the mobile phone. This way the need for any directory enquiries services is removed. This is what can be called "Caller ID surfing" of the Internet, as the name of the title suggests. Of course any other mobile phone or search engine could be similarly integrated in accordance with the invention.

Quite clearly another practical embodiment of the invention could be realized with Microsoft Bing search engine 630, a Microsoft operating system and/or Internet browser enabled phone 600, and also possibly the Microsoft social network "Windows Live Planet". In one of these practical embodiments involving Microsoft solutions as components, the Microsoft operating system or browser would recognize an outgoing and/or incoming caller ID, then search for documents with Bing 630 using the Caller ID or any data derived thereof as at least one search term. Additionally if the Caller ID or any data derived thereof would be associated with any profile page in Windows Live Planet, the Microsoft systems could be interfaced so that the Windows Live Planet profile page of a call party is displayed with the Caller ID of an outgoing and/or incoming call. Naturally Windows Live Planet could exist separately on the Internet 640 or in a closed network with search engine Bing 630, or with a different search engine, in accordance with the invention.

It should be noted that any features, phases or parts of the system 60 can be freely permuted and combined with embodiments 10, 20, 30, 40, 50, 70, 80 and/or 90 in accordance with the invention.

Even though the invention has been explained mainly in association with Caller IDs as calls occur it is clearly not limited to the current call situation only. In one particular embodiment the call log and/or contacts directory application of a mobile phone or subscriber terminal is integrated with the invention so that any missed calls or past calls or stored contact entries are associated with search results and/or social network profile pages of parties that have called the user or the user has called in the past, and/or of parties that are listed in the contacts directory application.

Figure 7:
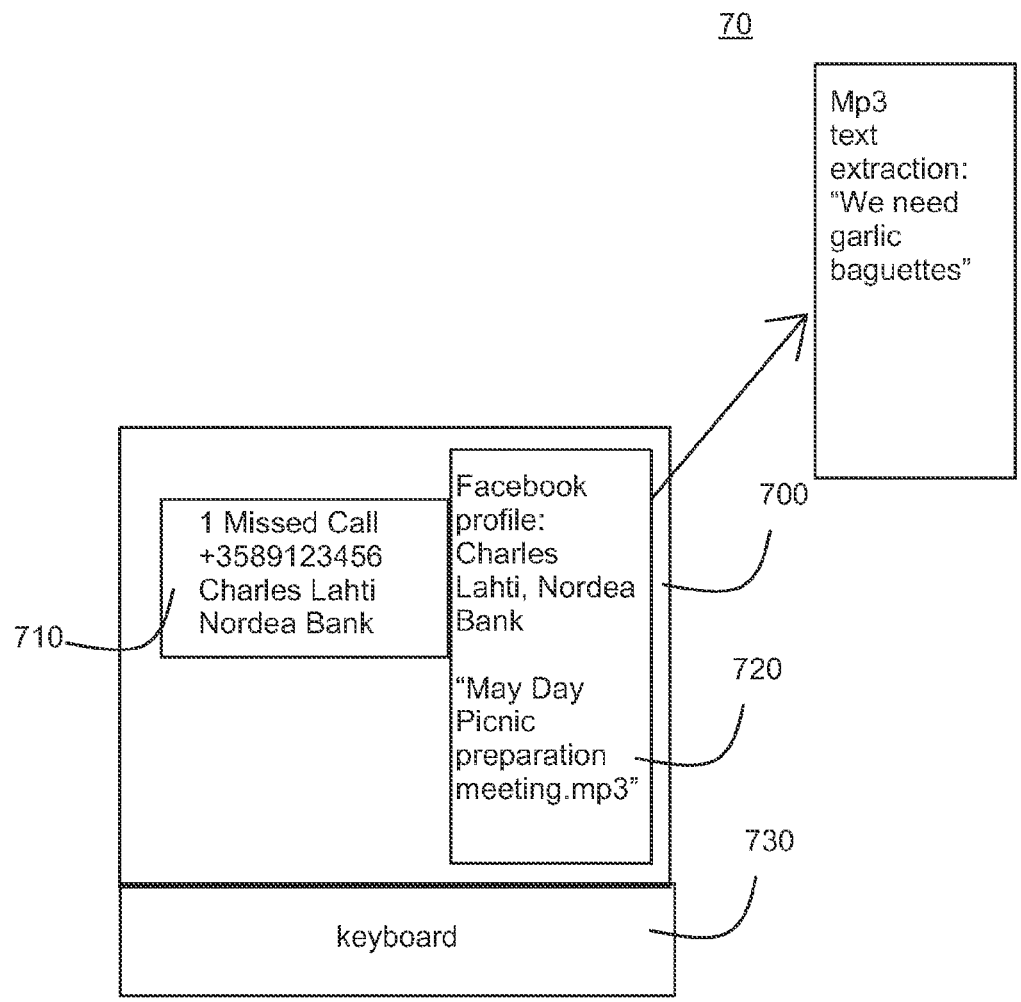
FIG. 7 demonstrates an embodiment 70 of the inventive subscriber terminal where the invention is applied to the subscriber terminal call log.

FIG. 7 shows an embodiment of the invention 70 integrated with the call log of a typical subscriber terminal, which can for example be a mobile phone. The call log is shown in screen section 710. The user has missed a call from Charles Lahti. The subscriber terminal has then connected to Facebook, searched for Charles Lahti and shows the Facebook profile page of Charles Lahti in screen section 720 in accordance with the invention. There is a recorded conversation concerning the picnic on the social network site titled with the filename "May Day Picnic preparation meeting.mp3", and from this file a text excerpt has been obtained: "We need garlic baguettes", which is available on the social network site and can be displayed to the user.

The user of the subscriber terminal 70 now knows by a quick look at the call log that he has missed a call from Charles Lahti, who is arranging a picnic and needs baguettes. Quite clearly this is a huge improvement to prior art, when the user would have only seen that Charles Lahti has called him, and he has missed the call.

It should be noted that any features, phases or parts of the system 70 can be freely permuted and combined with embodiments 10, 20, 30, 40, 50, 60, 80 and/or 90 in accordance with the invention.

Figure 8:
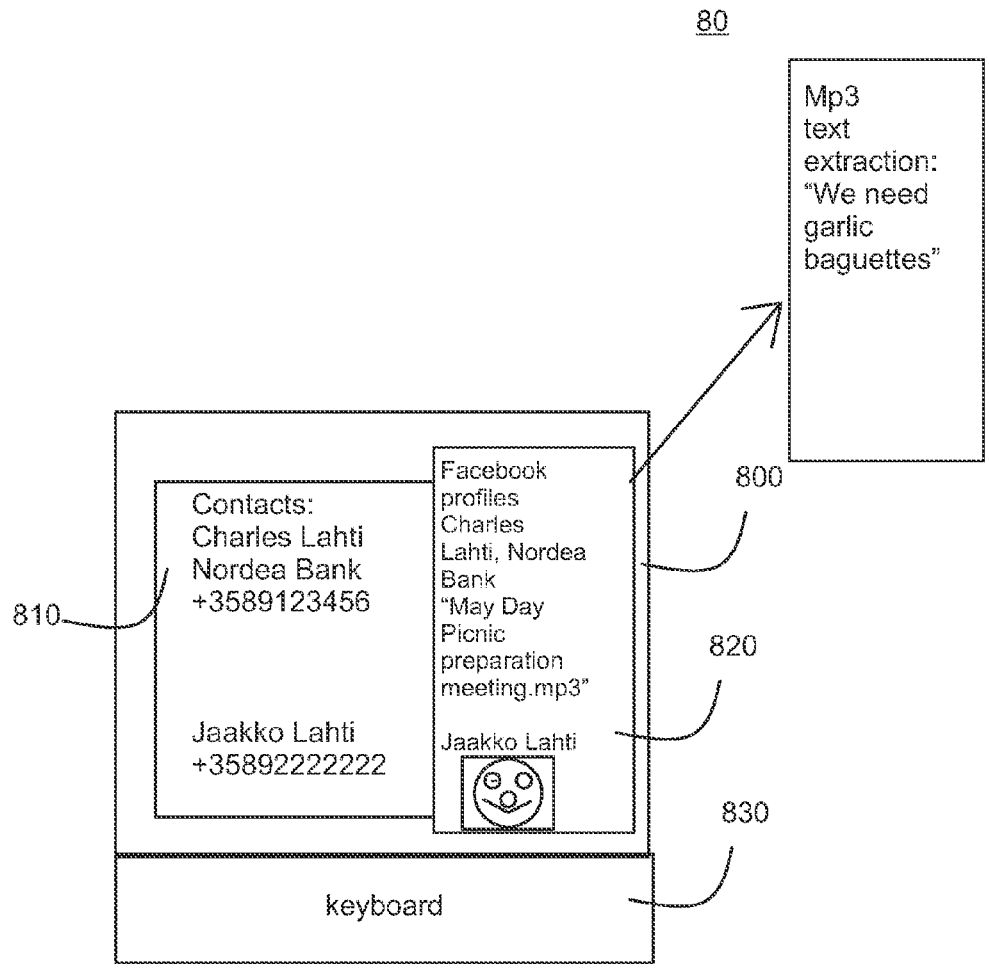
FIG. 8 demonstrates an embodiment 80 of the inventive subscriber terminal where the invention is applied to the subscriber terminal contacts directory.

FIG. 8 shows an integrated contacts directory with a social network application such as Facebook, Twitter or the like 80. In embodiment 80 the Facebook or similar social network account is integrated with the contacts application in a mobile station, mobile phone and/or computer. The subscriber terminal 80 logs onto the social network from time to time, or upon a command from the user, and the contact entries in the contact application are updated from the social network. The contact application simply matches a contact entry in the contacts application with a social network account from a "friend" or "connection", (i.e. people with whom the user is connected on the social network) and updates the most recent data from the subscriber terminal to the social network or from the social network to the subscriber terminal in some embodiments of the invention. The matching is done based on the telephone number, i.e. Caller ID, or name, email address, or by user specified commands in accordance with the invention. Even though the preferred embodiment is to show the most recent information with a contact entry, it is also possible to associate the most contextually relevant event on the social network with a contact entry in the contacts application in accordance with the invention. The relevant event in the social network can be searched as described in U.S. Ser. No. 12/758,258 or by other methods. In the embodiment 80 of the invention Charles Lahti and Jaakko Lahti (shown in screen section 810) are in the contacts application and the Facebook profiles that match these users are shown in screen section 820. The entry of Charles Lahti is associated with the Facebook entry next to it that had a recorded mp3 conversation, whereas contacts entry for Jaakko Lahti has a Facebook profile page with a recent photo of himself next to it.

Quite clearly it is in accordance with the invention to store a local copy of the social network status of all "connections" or "friends" of the user to the subscriber terminal even when the subscriber terminal logs off the social network. This way the connections can be used with reasonably updated information even when the social network is not available.

Quite clearly the screen sections can be combined in any logical manner in accordance with the invention. There can be many screen sections or just one, and the social network profile page and the contact entry of the same person can also be arranged to be shown in one section or part of the screen in an integrated fashion. For example the number+ 35892222222 could be inserted between the name Jaakko Lahti and the picture, producing a contacts application/social network mixed entry to the subscriber terminal 80 and its screen 800. Alternatively the screen could be used to only show one entry, say Jaakko Lahti and only social network pages and/or search results and/or any data derived thereof associated with entry Jaakko Lahti in some embodiments of the invention.

In addition to downloading recent updates from the social network to the contacts application, it is also possible and in accordance with the invention to upload data from the subscriber terminal 80 to the social network. For example media files (voice, image, video files) and/or messages can be associated with an entry in the contacts application in the subscriber terminal, from which they are arranged to be uploaded to the social network to the communication space between the user and social network account associated with the contacts entry in accordance with the invention.

For example in one preferable embodiment, whenever a message is sent to a party in the contacts application, the subscriber terminal 80 automatically updates a copy of the said message also to the social network, for example to the "wall" or communication space between the sender and the receiver in accordance with the invention.

It should be noted that any features, phases or parts of the system 80 can be freely permuted and combined with embodiments 10, 20, 30, 40, 50, 60, 70 and/or 90 in accordance with the invention.

Figure 9:
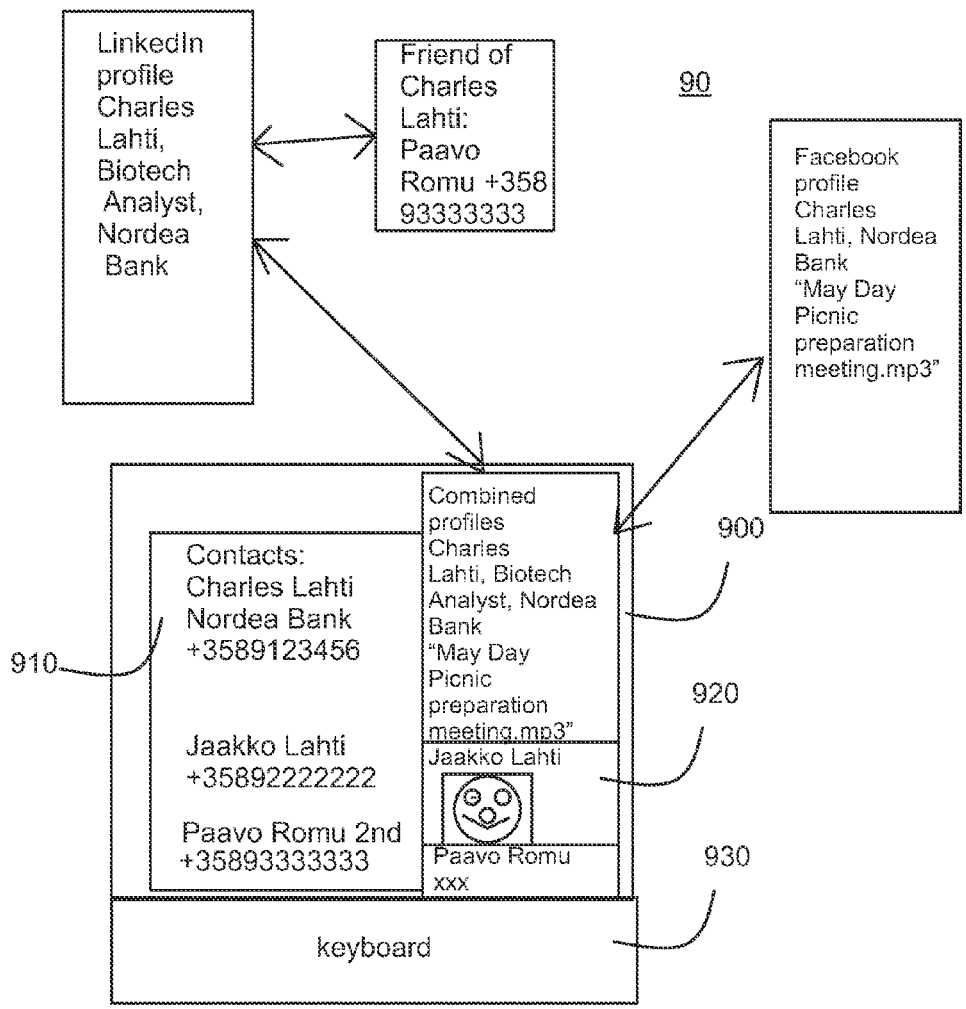
FIG. 9 demonstrates an embodiment 90 of the inventive subscriber terminal where the invention is applied to the subscriber terminal contacts directory with at least one social network.

FIG. 9 shows an embodiment of the invention using multiple social networks. Occasionally people use different social networks for different purposes, typically for example people use LinkedIn for business communication and Facebook for personal communication. However, people are usually interested of each other in a cross-disciplinary way, for example your friends are interested in what you are doing at work. In this embodiment of the invention the subscriber terminal connects to at least one social network, two in this case by typically logging in the subscriber of the subscriber terminal with usernames and passwords that are either stored in the subscriber terminal or provided by the user.

The subscriber terminal then searches the social networks based on typically name, telephone number, email address or the like. The Caller ID, i.e. telephone number of a person and the name are a good combination, because they typically define the person uniquely. The subscriber terminal 90 has a contacts entry for Charles Lahti with the phone number+ 3589123456. Charles Lahti has two user profiles, one in Facebook for personal communication and one in LinkedIn for business communication.

In accordance with the invention data is retrieved from both social networks and merged whilst eliminating redundancy and delivered to the contacts application of the subscriber terminal 90. In one embodiment the subscriber terminal has a LinkedIn application and/or a Facebook application installed onto the subscriber terminal and the subscriber terminal is arranged to read the relevant data from social network user profiles by using these applications and show it in the contacts application, call log application and/or Caller ID display during the call. This way for example the mobile phone applications that deal with communication party choice stay refreshed with recent background information on what is happening to the communication party. In another embodiment the subscriber terminal 90 is in connection to a server (not shown), which is arranged to be in connection with at least one social network. This server queries user specific data from at least one social network and combines the data from more than one social network in some embodiments. This data is then delivered in a compatible format to the contacts application, for example in screen section 920 the double entry of the organization "Nordea Bank" is not repeated from both social networks but this redundancy is eliminated in accordance with the invention. Thus the contacts applications in subscriber terminal may be arranged to contact a server that adapts the search results in to a data format that can be displayed in the Caller ID display, call log and/or contacts application in accordance with the invention.

Quite clearly one of the greatest assets of a social network is the fact that when you are connected with someone, that someone can share his connections with you, and you can expand your network to these connections. In one embodiment of the invention, connections of people that are connected to a party in the user's call log or contacts directory application can be copied to these applications and/or these applications can be arranged to access the entries of these connections automatically from the social network. For example Charles Lahti is connected to Paavo Romu on LinkedIn in embodiment 90, and the user has copied details of Paavo Romu to his contacts application. Paavo Romu's entry is marked as a $2^{nd}$, because it resulted from Charles Lahti's connection and not from a direct relationship between the user and Paavo Romu, as was the case with the user and Charlie Lahti. It is in accordance with the invention to surf for Caller ID entries based on one Caller ID entry, as the contact application now can retrieve contact entries from secondary social network connections of an original entry (Charles Lahti). Quite naturally this embodiment can also be used with the call log embodiment in accordance with the invention.

Quite clearly in all embodiments, it is in accordance with the invention to merge more than one search results into a one search result for display based on computational rules or algorithms that may reside on a network server and/or the subscriber terminal. For example data from two different social networks that relate to the same person can be combined similarly as in embodiment 90 with display of Caller ID or call log entries as explained in the earlier embodiments 10, 20, 30, 40, 50, 60, 70 and/or 80.

Quite clearly in all embodiments or any of their combinations the search terms can be reformatted with applicable computational logic rules, for example the phone number +3589123456 equates with +3589123456 internationally, 09123456 in Finland, and 123456 in Helsinki.

It should be noted that any features, phases or parts of the system 90 can be freely permuted and combined with embodiments 10, 20, 30, 40, 50, 60, 70 and/or 80 in accordance with the invention.

The invention has been explained above with reference to the aforementioned embodiments and several commercial and industrial advantages have been demonstrated. The methods and arrangements of the invention allow the user to obtain the newest public information about the person who calls him or he decides to call, or any documents that might be intermittent between people. In other words for example the Desktop and/or screen of the invention automatically arranges itself to a state in which it is easiest to work during the call, using searches made based on call parameters, such as Caller ID. The invention adds "bandwidth", i.e. speed, efficiency and more dimensions to personal communication, as the users of the inventive system can also visually see by documentation what is going on in the relationship between two or more people. In addition the invention can be used to refresh communication management applications of mobile phones with data from social networks, thereby incorporating social networks into contacts directory and call log applications.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

US 2005/0069095 A1
EP 1 587 291 B1
U.S. Ser. No. 12/758,258 of the Inventor Mikko Kalervo Väänänen

The invention claimed is:

1. A mobile subscriber terminal comprising:
   a call log software application and/or contacts directory software application; and
   a call log entry of said call log application or a contacts directory entry of said contacts directory software application arranged to be displayed on a screen of the mobile subscriber terminal,
   wherein the mobile subscriber terminal comprises a social network application integrated with the contacts directory software application, whereby the social network application integrated with the contacts directory software application is arranged to retrieve a social network page associated with the contacts directory entry or data derived from said social network page,
   said social network page or at least some of the data derived from said social network page of a party associated with the contacts directory entry is arranged to be displayed, and
   the social network application integrated with the contacts directory software application is arranged to upload media files including voice, image or video to the social network to a communication space between a user of the mobile subscriber terminal and a social network account associated with the contacts directory entry.

2. The mobile subscriber terminal as claimed in claim 1, wherein data to be associated with said contacts directory entry is arranged to be collected from at least two social networks and the combined data is arranged to be shown with said call log entry or contacts directory entry.

3. A telecommunication system comprising:
   a social network server and a mobile subscriber terminal comprising a call log software application or a contacts directory software application; and
   a call log entry of said application or a contacts directory entry of said contacts directory software application is displayed on a screen of the mobile subscriber terminal,
   wherein the mobile subscriber terminal comprises a social network application integrated with the contacts directory software, whereby the social network application integrated with the contacts directory software application is arranged to retrieve a social network page associated with the contacts directory entry or data derived from said social network page,
   said social network page or at least some of the data derived from said social network page of a party associated with the said contacts directory entry is displayed, and
   the social network application integrated with the contacts directory software application is arranged to upload media files including voice, image or video to the social network to a communication space between a user of the mobile subscriber terminal and social network account associated with the contacts directory entry.

4. The telecommunication system as claimed in claim 3, wherein data to be associated with said contacts directory entry is arranged to be collected from at least two social networks and the combined data is arranged to be shown with said call log entry or contacts directory entry.

5. A software program product embodied in a non-transitory storage medium configured to cause one or more processing devices to execute a method, the method comprising:
- displaying a contacts directory entry of a contacts directory software application on a screen of a mobile subscriber terminal;
- retrieving, by a social network application integrated with the contacts directory software application, a social network page associated with the contacts directory entry or data derived from said social network page;
- displaying said social network page or at least some of the data derived from said social network page of a party associated with said contacts directory entry; and
- uploading, the social network application integrated with the contacts directory software application, media files including voice, image or video to the social network to a communication space between a user of the mobile subscriber terminal and social network account associated with the contacts directory entry.

6. The software program product as claimed in claim 5, further comprising collecting data to be associated with at least one contacts directory entry from at least two social networks, and
displaying the combined data with said contacts directory entry.

7. A method, comprising:
- displaying a contacts directory entry of a contacts directory software application on a screen of a mobile subscriber terminal, the contacts directory software application or a call log software application being provided at a software program product embodied in a non-transitory storage medium configured to cause one or more processing devices to execute the contacts directory software application;
- retrieving, by a social network application integrated with the contacts directory software application at the mobile subscriber terminal, a social network page associated with the contacts directory entry or data derived from said social network page;
- displaying said social network page or at least some of the data derived from said social network page of a party associated with said contacts directory entry; and
- uploading, by the social network application integrated with the contacts directory software application, media files including voice, image or video to the social network to a communication space between a user of the mobile subscriber terminal and a social network account associated with the contacts directory entry.

8. The method as claimed in claim 7, further comprising collecting data to be associated with at least one contacts directory entry from at least two social networks, and
displaying the combined data with said contacts directory entry.

* * * * *